Feb. 9, 1960     L. DAHLGREN     2,924,038
ICE FISHING DEVICE
Filed June 12, 1959
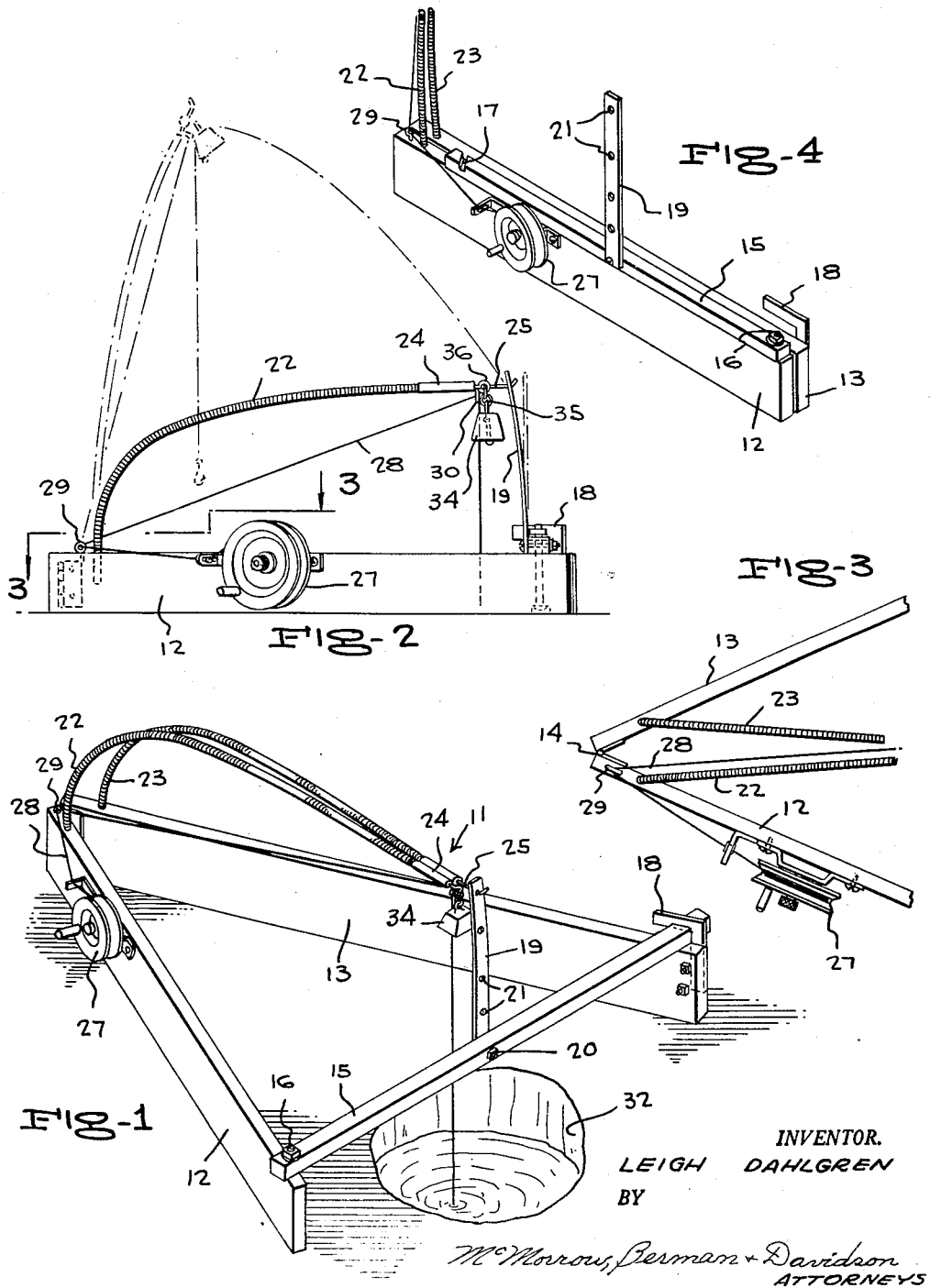
INVENTOR.
LEIGH DAHLGREN
BY
McMorrow, Berman & Davidson
ATTORNEYS United States Patent Office 2,924,038
Patented Feb. 9, 1960

2,924,038
ICE FISHING DEVICE
Leigh Dahlgren, Merriman, Nebr.
Application June 12, 1959, Serial No. 819,871
4 Claims. (Cl. 43—16)

This invention relates to fishing apparatus, and more particularly to an automatic fishing device to be used on ice for fishing through a hole in the ice.

The main object of the invention is to provide a novel and improved ice fishing device which is simple in construction, which is easy to set up for use, and which provides an audible alarm when a fish is caught thereby.

A further object of the invention is to provide an improved ice fishing apparatus which is inexpensive to manufacture, which is durable in construction, which is foldable to a compact size for transportation and storage, and which may be readily set up for use adjacent a hole in the ice without requiring any tools or an undue amount of effort in arranging the apparatus for use.

Further objects and advantages of the invention will become apparent from the following description and claims, and from the accompanying drawings, wherein:

Figure 1 is a perspective view of an improved ice fishing apparatus according to the present invention, shown set up adjacent a hole in the ice in operating position.

Figure 2 is a side elevational view of the fishing apparatus shown in Figure 1.

Figure 3 is a fragmentary top plan view of the apparatus of Figures 1 and 2.

Figure 4 is a fragmentary perspective view of the fishing apparatus of Figures 1, 2 and 3, shown in folded position.

Referring to the drawings, 11 generally designates an improved ice fishing device according to the present invention. The device comprises a pair of elongated rigid bar members 12 and 13 which are hingedly connected together by a conventional hinge 14 so that the bar members 12 and 13 may be unfolded to a divergent relationship, as shown in Figure 1, or may be folded to a closely adjacent side-by-side condition, as shown in Figure 4. Designated at 15 is a cross bar which is pivotally connected at 16 to the free end of the elongated rigid member 12. The cross bar 15 is formed with a locking groove 17 adjacent its free end which is lockingly engageable with an upstanding rightangled locking arm 18 secured to the free end of the rigid bar member 13. As shown in Figure 1, the arm 18 extends horizontally and is slidably engageable in the groove 17 when the rigid bar members 12 and 13 are in divergent relationship, whereby to lock said members 12 and 13 in said divergent relationship until the cross bar 15 is manually disengaged from the horizontally extending top arm of the locking bracket member 18.

Designated at 19 is an upstanding resilient flexible detent bar which is secured at 20 to the intermediate portion of the cross bar 15, the detent bar 19 being formed with a plurality of locking apertures 21. Designated at 22 and 23 are respective upstanding flexible resilient rod members which are secured to the top edges of the members 12 and 13 adjacent their hinge connection, the top ends of the rod members 12 and 13 being connected together, as by a rigid dual fastening sleeve 24 receiving the top ends of the rod members 22 and 23 in closely adjacent side-by-side relationship and rigidly connecting the free ends of the rod members. One of the rod members is formed with a forwardly projecting detent hook 25 which is releasably engageable in a selected aperture 21 of the trigger arm 19 when the trigger arm is in the flexed position thereof illustrated in Figure 2. As will be seen from Figure 2, the hook element 25 holds the trigger arm 19 in its laterally flexed position, but is disengageable from the trigger arm 19 responsive to a downward force exerted on the free ends of the rod members 22 and 23. Thus, the bight portion of the hook element 25 extends upwardly but is relatively short so that when the free ends of the rod members 22 and 23 are pulled downwardly, the trigger arm 19 may unflex and resume its normal vertical position, shown in dotted view in Figure 2. This releases the rod members 24 from the restraint of the trigger arm 19 and allows the rod members to unflex to their dotted view positions illustrated in Figure 2.

A reel 27 is rotatably mounted on the rigid elongated member 12, said reel having a fishing line 28 wound thereon. The fishing line 28 extends slidably through an eye member 29 secured to the top edge of the rigid member 12 adjacent the hinge connection thereof, the fishing line also extending slidably through an eye member 30 secured to the rigid connecting sleeve 24. Thus, the fishing line extends downwardly from the eye member 30 and may be passed through a hole 32 formed in the ice on which the device is supported, as is illustrated in Figure 1.

The device may be set up for use by unfolding the rigid members 12 and 13 and connecting them in their divergent positions by the cross bar 15, as is illustrated in Figure 1. The flexible rod members 22 and 23 may then be releasably secured in their lowered positions by engaging the hook element 25 in a selected aperture 21 of the trigger member 19, flexing the trigger member laterally to receive the hook member 25, as is illustrated in Figure 2. The fishing line, with a suitable hook attached to the end thereof, may then be lowered through the hole 32 in the ice. When a fish engages the line by striking at the hook, the line is pulled downwardly, allowing the trigger arm 19 to unflex and allowing the rods 22 and 23 to also unflex and to rise to their dotted view positions, shown in Figure 2.

An alarm bell 34 is attached to the free ends of the flexible rod members 22 and 23, as by means of a pair of chain links 35 connected to an eye member 36 formed on the end of the flexible rod 22. Thus, when a fish engages the hook and pulls on the line, the rod members 22 and 23 are intermittently jerked, causing the bell 34 to be oscillated, providing an audible signal which indicates that a fish has engaged the line. As long as the fish continues to pull on the line the rod members 22 and 23 will be held in substantially flexed conditions and the movements of the rod members will cause the bell 34 to sound. When tension on the fishing line is released, the rod members 24 and 23 rise to their dotted view positions, illustrated in Figure 2.

When the device is not in use, it may be folded to the relatively compact arrangement illustrated in Figure 4, wherein the rigid members 12 and 13 are disposed in adjacent side-by-side relationship and the cross bar 15 is folded to a position overlying the top edge of the bar member 12.

While a specific embodiment of an improved ice fishing apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing apparatus comprising a pair of elongated rigid members, means hingedly connecting the members together at their ends, a cross bar, means to connect said cross bar to said members when the members are in divergent relation, an upstanding flexible resilient trigger arm on said cross bar, a pair of flexible resilient rod members respectively secured to the elongated rigid members, means to releasably engage the free ends of the rod members with the trigger arm when the trigger arm is in a flexed condition and being releasable responsive to a downward pull on the free ends of the rod members, and means on said free ends of the rod members constructed and arranged to support a fishing line.

2. A fishing apparatus comprising a pair of elongated rigid members, means hingedly connecting the members together at their ends, a cross bar, means to connect said cross bar to said members when the members are in divergent relation, an upstanding flexible resilient trigger arm on said cross bar, a pair of flexible resilient rod members respectively secured to the elongated rigid members, means to releasably engage the free ends of the rod members with the trigger arm when the trigger arm is in a flexed condition and being releasable responsive to a downward pull on the free ends of the rod members, means on said free ends of the rod members constructed and arranged to support a fishing line, and a signal bell on the free ends of the rod members.

3. A fishing apparatus comprising a pair of elongated rigid members, means hingedly connecting the members together at their ends, a cross bar pivotally connected to one of the members, means on the other member lockingly engageable with the cross bar to secure the members in divergent relation, an upstanding flexible resilient trigger arm on said cross bar, said trigger arm being formed with a detent aperture, a pair of flexible resilient rod members respectively secured to the elongated rigid members, means connecting the free ends of the rod members together, detent means on the free end of one of the rod members releasably engageable in said aperture when the trigger arm is in a flexed condition and being releasable responsive to a downward pull on the free ends of the rod members, and means on said free ends of the rod members constructed and arranged to support a fishing line.

4. A fishing apparatus comprising a pair of elongated rigid members, means hingedly connecting the members together at their ends, a cross bar pivotally connected to one of the members, means on the other member lockingly engageable with the cross bar to secure the members in divergent relation, an upstanding flexible resilient trigger arm on said cross bar, said trigger arm being formed with a detent aperture, a pair of flexible resilient rod members respectively secured to the elongated rigid members, means connecting the free ends of the rod members together, detent means on the free end of one of the rod members releasably engageable in said aperture when the trigger arm is in a flexed condition and being releasable responsive to a downward pull on the free ends of the rod members, means on said free ends of the rod members constructed and arranged to support a fishing line, and a signal bell on the free ends of the rod members.

No references cited.